(12) United States Patent
Tondolo et al.

(10) Patent No.: US 8,301,275 B2
(45) Date of Patent: Oct. 30, 2012

(54) MODIFIED PROPORTIONAL INTEGRAL DERIVATIVE CONTROLLER

(75) Inventors: Flavio Tondolo, Stezzano BG (IT); Roberto Valoti, Seriate BG (IT)

(73) Assignee: STI srl, Gorle-Bergamo (IT)

(*) Notice: Subject to any disclaimer, the term of this patent is extended or adjusted under 35 U.S.C. 154(b) by 330 days.

(21) Appl. No.: 12/794,109

(22) Filed: Jun. 4, 2010

(65) Prior Publication Data

US 2011/0301724 A1    Dec. 8, 2011

(51) Int. Cl.
*G05B 13/02* (2006.01)

(52) U.S. Cl. .......... 700/42; 700/37; 700/43; 700/44; 700/46; 700/74

(58) Field of Classification Search .......... 700/28, 700/37, 42–46, 73–74
See application file for complete search history.

(56) References Cited

U.S. PATENT DOCUMENTS

| | | | | |
|---|---|---|---|---|
| 4,578,747 A * | 3/1986 | Hideg et al. | ............ | 700/31 |
| 4,864,490 A * | 9/1989 | Nomoto et al. | ............ | 700/37 |
| 4,908,747 A | 3/1990 | Lane et al. | | |
| 5,059,880 A * | 10/1991 | Hiroi | ............ | 318/610 |
| 5,121,332 A * | 6/1992 | Balakrishnan et al. | ...... | 700/127 |
| 5,124,626 A * | 6/1992 | Thoen | ............ | 318/610 |
| 5,384,526 A | 1/1995 | Bennett | | |
| 5,394,322 A * | 2/1995 | Hansen | ............ | 700/37 |
| 5,431,182 A * | 7/1995 | Brown | ............ | 137/85 |
| 5,443,862 A * | 8/1995 | Buffat et al. | ............ | 427/526 |
| 5,541,832 A * | 7/1996 | Nakajima et al. | ............ | 700/28 |
| 5,541,833 A * | 7/1996 | Bristol et al. | ............ | 700/45 |
| 5,691,615 A * | 11/1997 | Kato et al. | ............ | 318/609 |
| 6,056,008 A * | 5/2000 | Adams et al. | ............ | 137/487.5 |
| 6,128,541 A * | 10/2000 | Junk | ............ | 700/39 |
| 6,317,637 B1 * | 11/2001 | Limroth | ............ | 700/42 |
| 6,424,873 B1 * | 7/2002 | Przybylski | ............ | 700/42 |
| 6,445,980 B1 * | 9/2002 | Vyers | ............ | 700/282 |
| 6,495,984 B2 | 12/2002 | Kirchberg | | |
| 6,554,198 B1 | 4/2003 | Hull et al. | | |
| 6,745,084 B2 * | 6/2004 | Boger et al. | ............ | 700/13 |
| 6,754,542 B1 * | 6/2004 | Tanaka | ............ | 700/42 |
| 6,767,178 B2 | 7/2004 | Staroselsky et al. | | |
| 7,089,733 B1 | 8/2006 | Jackson et al. | | |
| 2003/0038608 A1 * | 2/2003 | Meisselbach | ............ | 318/568.16 |

FOREIGN PATENT DOCUMENTS

EP    0 884 667    12/1998

OTHER PUBLICATIONS

International Search Report and Written Opinion for PCT/IB2011/001233, Dec. 16, 1998.

(Continued)

*Primary Examiner* — Ramesh Patel (74) *Attorney, Agent, or Firm* — Stetina Brunda Garred & Brucker (57) ABSTRACT

A method and device for controlling a process variable based upon a set point is disclosed. A process variable is measured, and a proportional term is assigned to a manipulated variable that is based upon a product of a proportional gain coefficient and an error magnitude between the process variable and the set point. An integral term is added to the manipulated variable under a first set of conditions, and a derivative term is added to the manipulated variable under a second set of conditions different from the first set of conditions. The sum of the proportional term, the integral term, and the derivative term is output, resulting in the process variable being responsively adjusted thereto.

23 Claims, 4 Drawing Sheets

OTHER PUBLICATIONS

Purahong B Ed—Fong A C M et al. "Soft-Switching Fuzzy P2ID for Robot Navigation." Industrial Electronics and Applications, 2008. IEEE, Piscataway, NJ. (no copy available).

Ang K H et al. "PID Control System Analysis, Design, and Technology." IEEE Transactions on Control Systems Technology 2005. IEEE Service Center, New York, NY. (no copy available).

* cited by examiner

MODIFIED PROPORTIONAL INTEGRAL DERIVATIVE CONTROLLER

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure is related generally to control systems for industrial processes, and more particularly, to a modified proportional integral derivative (PID) controller that drives electro-pneumatic valve actuators to regulate a fluid flow control process.

2. Related Art

Many industrial processes involve the movement of fluid such as gas, steam, water, and chemical compounds. The flow of the fluid is regulated by a control valve that has a passageway that is selectively opened and closed with a movable obstruction or valve element connected to a stem. An actuator, in turn, is connected to the stem, and provides the motive force to open and close the valve element. Pneumatic, hydraulic, electrical, or mechanical energy is converted by the actuator to linear or rotational motion, depending on the configuration of the control valve. Pneumatic systems are typically utilized for valve actuators due to several distinct advantages, but primarily for the quicker and more precise degree of control.

A conventional pneumatic actuator is comprised of a piston sealed within a cylinder, and the piston including a connecting rod that is mechanically coupled to the valve element. Compressed air is forced into and out of the cylinder to move the connecting rod, which is mechanically coupled to the stem of the control valve.

Precise and accurate control of the valve actuator, and hence the valve element, can be achieved with a positioner device coupled thereto. An electrical control circuit provides a variable current signal to the positioner device that proportionally corresponds to particular states of the actuator and hence a particular position of the control valve. The electrical control circuit and the electrical current signals generated thereby may be part of a broader process managed by a distributed control system. Generally, the electrical current varies between 4 milliamps (mA) and 20 mA according to industry-wide standards; at 4 mA the valve positioner may fully open the valve element, while at 20 mA, the valve positioner may fully close the valve element.

The desired state of the actuator represented by the electrical current, which is the desired position of the control valve, is referred to as the set point. For pneumatic valve actuators, the related positioner device includes a spool that rotates or slides axially in a housing to port compressed air from a pressure line to the valve actuator, with the movement of the spool being governed by the electrical signal. The positioner device compares the set point to the current position of the actuator and determines if there is a difference or error. Additional adjustments to the position of the spool are made to adjust the flow of compressed air to the valve actuator so that the margin between the set point and the process variable, i.e., the error, is reduced. The measured position feedback of the actuator may also be referred to as the process variable, while the position of the spool is referred to as the manipulated variable.

The manipulated variable output is a function of the particular feedback control loop implemented by the positioner device. Depending on the specifics of the feedback control loop, response time, overshoot, and damping ratios can differ. Response time refers to the speed at which positioner device responds to a change in the set point, overshoot refers to the extent to which the manipulated variable initially exceeds a new set point, and damping ratio refers to the rate at which the manipulated variable reaches a steady state after a new set point.

One commonly implemented feedback control loop function is proportional-integral-derivative (PID) control. Standard PID control is well known in the art, and is understood to be suitable for applications where accurate maintenance of the process variable is important, such as fluid flow control valves in an industrial process. PID controllers are typically implemented digitally on dedicated microprocessors. The manipulated variable output, or corrective gain, is a sum of proportional integral, and derivative terms that are functions of the magnitude of error. Specifically, the proportional term is a product of a proportional gain KP and the error e at a particular instant in time t, and represents a reaction to current error. The proportional term is commonly notated as:

$KPe(t)$ in the analog domain, or $KPe_n$ in the digital domain.

The integral term is a product of the sum of past instantaneous errors e over time t and an integral gain KI. The integral term is used to correct steady state error, and is commonly notated as:

$$KI \int_0^t e(\tau)d\tau \text{ in the analog domain, or}$$

$$KI \sum_{K=0}^{n} (e_K + e_{K-1}) \text{ in the digital domain.}$$

The derivative term is a product of the rate of change of error e over time t and a derivative gain KD. The derivative term is used to reduce the magnitude of overshoot, and hence oscillation, caused by the integral term. It also serves to reduce the time needed to reach a steady state, and increase stability. It is commonly notated as:

$$KD \frac{de(t)}{dt} \text{ in the analog domain, or}$$

$$KD(e_n - e_{n-1}) \text{ in the digital domain.}$$

Conventional PID controllers have a number of deficiencies, particularly when used in connection with high dynamic systems such as valve positioners with high flow rate spools and high-speed actuator devices. Despite substantial improvements in microprocessors that have increased calculation speeds of the PID mathematical calculations, there remains slow oscillations around the set point resulting from the integral term, vibration/noise associated with the derivative term, and so forth. Accordingly, there is a need in the art for an improved proportional integral derivative controller.

BRIEF SUMMARY

In accordance with one embodiment of the present disclosure, there is contemplated a method for controlling a process variable based upon a set point. The method may begin with a step of measuring the process variable. Thereafter, there may be a step of assigning a proportional term to a manipulated variable. The proportional term may a product of a proportional gain coefficient and an error magnitude of a difference between the set point and the process variable at a given time instance.

The method may also include adding an integral term to the manipulated variable under a first set of conditions. The integral term may be a product of an integral gain coefficient and a sum of a predefined number of error magnitudes over a time interval. The first set of conditions may include a rate of change of the process variable over the time interval being less than a first threshold rate. Additionally, the first set of conditions may also include the error magnitude at the given time instance being greater than a predefined deadband. Furthermore, the first set of conditions may include a rate of change of the process variable over the time interval being greater than a first threshold rate, the manipulated variable over the time interval being constant, error magnitudes increasing over the time interval, and the error magnitude at the given time instance being greater than the predefined deadband.

The method may continue with a step of adding a derivative term to the manipulated variable under a second set of conditions different from the first set of conditions. The derivative term may be a product of a derivative gain coefficient and the rate of change of the error magnitudes over the time interval. The second set of conditions may include a rate of change of the process variable over the time interval being greater than a second threshold rate. The second set of conditions may also include the rate of change of the error magnitudes over the time interval being negative.

The method may include a step of generating a controller output of the manipulated variable, where the process variable is responsively adjusted to the generated controller output.

In accordance with another embodiment of the present disclosure, there is a controller device for an actuator of a control valve, where the actuator includes an input port and an output port. The device may have a set point input receptive to a signal representative of a set point value. It may also have an actuator position feedback connectible to the output port of the actuator. The actuator position feedback may be receptive to a process variable value. There may also be an actuator drive output connectible to the input port of the actuator. An output corresponding to the manipulated variable value may be generated therefrom. The device may also have a proportional module that generates a proportional term, as well as an integral module that generates a non-zero integral term under a first set of conditions. There may also be a derivative module that generates a non-zero derivative term under a second set of conditions different from the first set of conditions. In addition, the device may include an adder module that generates the manipulated value from a sum of the proportional term, the integral term, and the derivative term.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as top and bottom, first and second, and the like are used solely to distinguish one entity from another without necessarily requiring or implying any actual such relationship or order between such entities.

Figure 1:
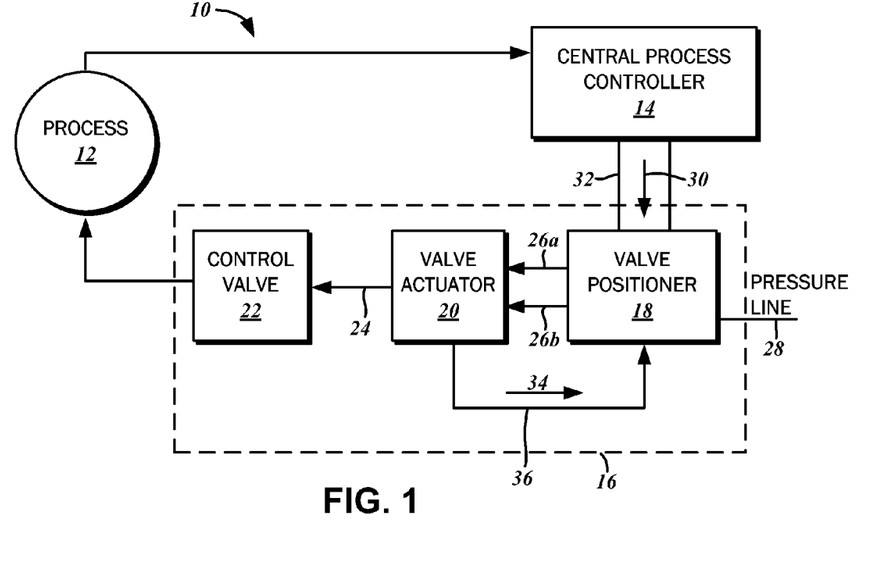
FIG. 1 is a block diagram illustrating an exemplary industrial control process with which various embodiments of the present disclosure may be implemented.

The block diagram of FIG. 1 generally illustrates a process control system 10, an exemplary environment within which various embodiments of the present disclosure may be implemented. More particularly, the process control system 10 includes a fluid flow process 12 that is regulated by a central process controller 14. Although the diagram illustrates one fluid flow process 12 being regulated by one central process controller 14, it will be understood that there may be various sub-processes that are also separately regulated by the central process controller 14. The single process 12 is shown for simplified illustration purposes only.

The central process controller 14 is connected to a control valve system 16, which includes a valve positioner 18, a valve actuator 20, and a control valve 22. In general, the control valve 22 defines a passageway through which the fluid of the process 12 flows. By opening, closing, or obstructing the passageway by different amounts with a valve element, the process 12 can be regulated. The valve element is mechanically coupled to a valve stem, which can be manipulated by an external motive force. In accordance with the conventional control valve system 16, the valve actuator 20 is coupled to the valve stem, and provides a mechanical output 24 to move the valve stem, and hence the valve element of the control valve 22.

It is contemplated that the valve actuator 20 is pneumatically driven, that is, the flow of compressed air is translated into the mechanical output 24, also referred to as the manipulated variable. In this regard, the valve actuator 14 includes a cylinder within which a piston reciprocates. Compressed air is supplied to and exhausted from one or more chamber of the cylinder, and as the piston moves, so does a connecting rod that is linked to the valve stem. The valve actuator 14 has a first pneumatic input 26a and a second pneumatic input 26b, which is characteristic of a double acting type, i.e., compressed air is supplied to one side of the chamber while the other side is exhausted. A single-acting actuator with spring return may be used instead. Although one type of linear valve actuator 20 has been described, it is by way of example only and not of limitation. Any other type of actuator, such as a rotary type or a diaphragm type may be readily substituted.

The components of the control valve system 16 are variously described herein as being driven by compressed air, though it will be appreciated that any other inert gasses may be utilized. Along these lines, other fluid power systems such as hydraulics may be substituted without departing from the scope of the present disclosure. Compressed air offers several advantages with respect to response times and safety in potentially hazardous industrial environments.

The supplying and exhausting of the compressed air to the valve actuator 20 is governed by the valve positioner 18, which may also be referred to in the art as valve position controller or a servomechanism. The basic function of the positioner device 12 involves the selective porting of compressed air from a pressure line 28 to the pneumatic inputs 25a, 26b. The volume of compressed air flowing to the valve actuator 20 depends upon an external input, which according to one embodiment, is a valve position signal 30 provided to the valve positioner 18 over a two-wire connection 32. The value represented by the valve position signal 30 is also referred to as the set point. The two-wire connection 32 is linked to the central process controller 14 as indicated above.

Per common industry standards, the valve position signal 30 is an analog current ranging between 4 mA and 20 mA. Although the basic operation of the process control system 10 does not require it, the valve position signal 30 can carry a digital signal utilized by the valve positioner 18 for additional functionality such as diagnostics, configuration, and so forth, and is accordingly HART compliant (Highway Addressable Remote Transducer). In certain embodiments suitable for deployment in hazardous environments, the valve position signal 30 may also provide electrical power to the control valve system 16 and other associated components, specifically, the valve positioner 18

The valve position signal 30 can be quantified as a percentage of the fully open or fully closed position of the control valve, and more specifically, as the pressure of the compressed air that is ported from the pressure line 28 to the pneumatic inputs 26a, 26b for achieving that position. For example, upon proper calibration, a 0% (4 mA) input signal may be defined as the fully closed position, while a 100% signal (20 mA) input signal may be defined as the fully open position. A 12 mA signal may thus represent a 50% position.

Figure 2:
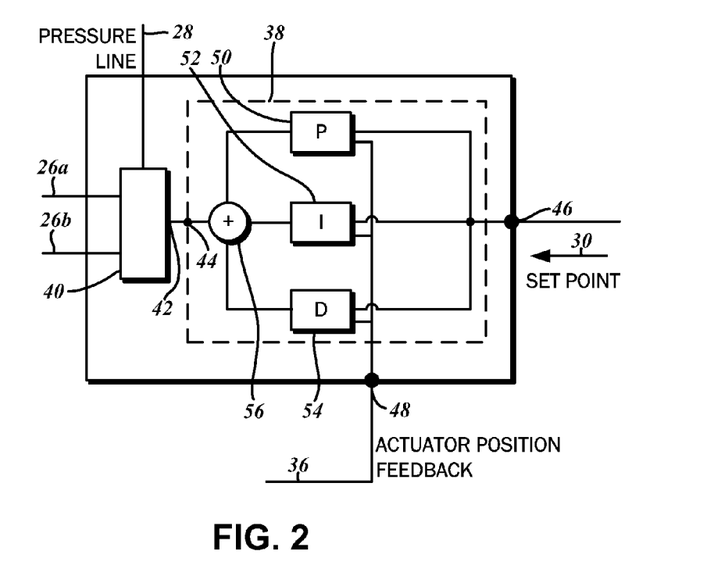
FIG. 2 is a block diagram of sub-modules of a proportional integral derivative (PID) controller.

With concurrent reference to the block diagram of FIG. 2, according to one embodiment of the present disclosure, a microprocessor 38 receives the valve position signal 30. Although the control valve system 16 may be implemented with a series of analog circuits, embodiments with the microprocessor 38 may be simpler to develop as involving conventional data processing functions known in the art. The processing functions are understood to be digital calculations based on measurements converted to discrete values. In order to ensure correct positioning of the valve actuator 20, a feedback sensor coupled to the valve actuator 20 reads the actual position thereof and transmits a feedback signal 34 to the valve positioner 18 via a feedback line 36. The sensed position of the valve actuator 20 is also referred to as the process variable. The transducer in the valve actuator 20 is then adjusted to supply more or less compressed air to the valve actuator 20 to position the same to reach the designated set point.

Generally, the conversion of the electrical valve position signal 30 to a corresponding pneumatic output is achieved with a transducer 40. In further detail, the transducer 40 has an input 42 connected to an output 44 of the microprocessor 38. As indicated above, the signal levels correspond to the flow of compressed air from the pressure line 28 to the pneumatic inputs 26a, 26b of the valve actuator 20, which pneumatically alters the positioning of the valve element. The pneumatic output from the transducer 40 is also referred to as an actuator drive output, and the pressure or flow rate therefrom, as well as the corresponding electrical signal from the microprocessor 38, are referred to as the manipulated variable.

The valve positioner 18 includes a set point input 46 that is connected to the two-wire connection 32 from the central process controller 14, and as briefly indicated above, is receptive to the valve position signal 32 representative of the set point. Along these lines, the valve positioner 18 also includes an actuator position feedback 48, which is connectible to the valve actuator 20 via the feedback line 36. As previously described, the feedback signal 34 received is representative of the process variable.

In accordance with another embodiment of the present disclosure, a method to effect a change in the flow rate of compressed air to the valve actuator 14 to quickly and accurately position the control valve 22 to the desired set point is contemplated. It will be appreciated, however, that the method may be utilized for other systems besides valve control as described above, and indeed, any control system that involves a set point, a process variable, and a manipulated variable that is controlled to direct the process variable to the set point may be substituted.

It is expressly contemplated that the valve positioner 18 implements the aforementioned method for controlling the process variable based upon the set point. To this end, another embodiment of the present disclosure envisions the valve positioner 18 including a proportional module 50, an integral module 52, a derivative module 54, and an adder module 56 that aggregates the outputs therefrom to generate an output of the manipulated variable to the transducer 40. Further functional details of these modules will be described in relation to the associated method below. As noted above, the microprocessor 38 is understood to be a general-purpose data processing apparatus with data addressing functions, arithmetic and logic functions, and control flow functions. In this regard, the proportional module 50, the integral module 52, the derivative module 54, and the adder module 56 may be implemented as a program of instructions executable by the microprocessor 38, and may be tangibly embodied on a storage medium accessible by the same.

Figure 3:
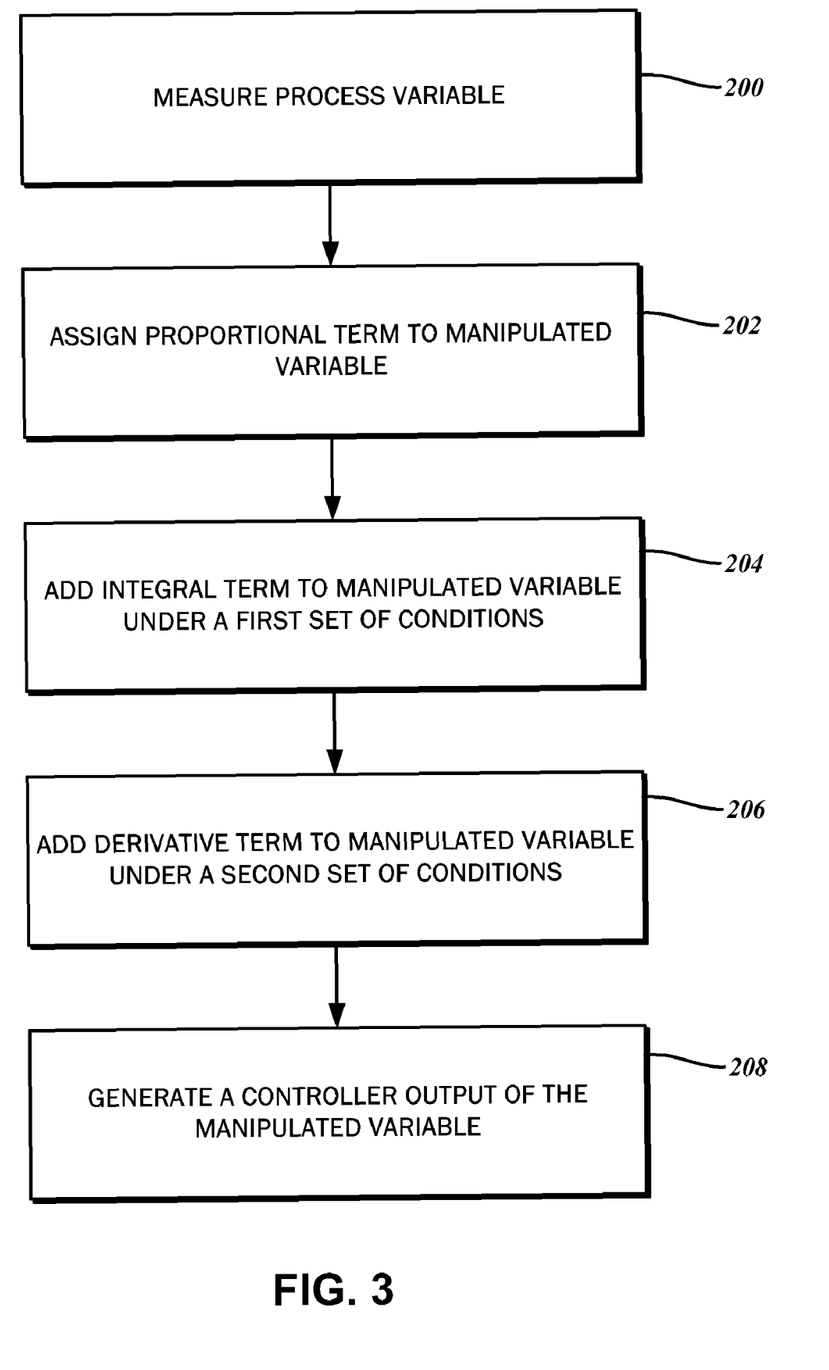
FIG. 3 is a flowchart illustrating a method for controlling a process variable in accordance with one embodiment of the present disclosure.

With reference to the flowchart of FIG. 3, the method begins with a step 200 of measuring the process variable. As previously explained, the process variable in the exemplary control valve system 16 refers to the value from the feedback signal 34 of the valve actuator 20 that is representative of its specific position as currently measured.

Next, in accordance with a step 202, a proportional term is assigned to the manipulated variable, which in the exemplary control valve system 16, is representative of the responsive output 44 to the transducer 40. According to the embodiment of the present disclosure shown in FIG. 3, the proportional module 50 has the corresponding feature in which the proportional term is generated thereby. In further detail, the proportional term is a product of a proportional gain coefficient $K_P$ and an error magnitude $Pe_n$. As will be described in greater detail below, other features of the method accommodate a high proportional gain coefficient that, in turn, results in a higher reactivity. Error magnitude is understood to be the difference between the set point, which, in the exemplary control valve system 16, is specified with the valve position signal 30 from the central process controller 14, and the process variable. In other words, the error magnitude is the difference between the current position of the valve actuator 20 and what it is set to be.

The method then continues with a step 204 of adding an integral term to the manipulated variable under a first set of conditions. This step may be implemented in the integral module 52. It will be understood that as utilized herein, the step of adding the integral term to the manipulated variable may include storing the calculated value in a temporary memory before being output to the transducer 40. With reference to the flowchart of FIG. 3, in a decision branch 300, it is determined whether the valve actuator 20 is moving or not. In particular dz/dt is understood to refer to the rate of change of the process variable, and V2 is understood to refer to a predefined threshold rate of change. When the valve actuator 20 is moving, then dz/dt will be greater than the threshold rate of change, otherwise, it will be less than the threshold rate of change.

Figure 4:
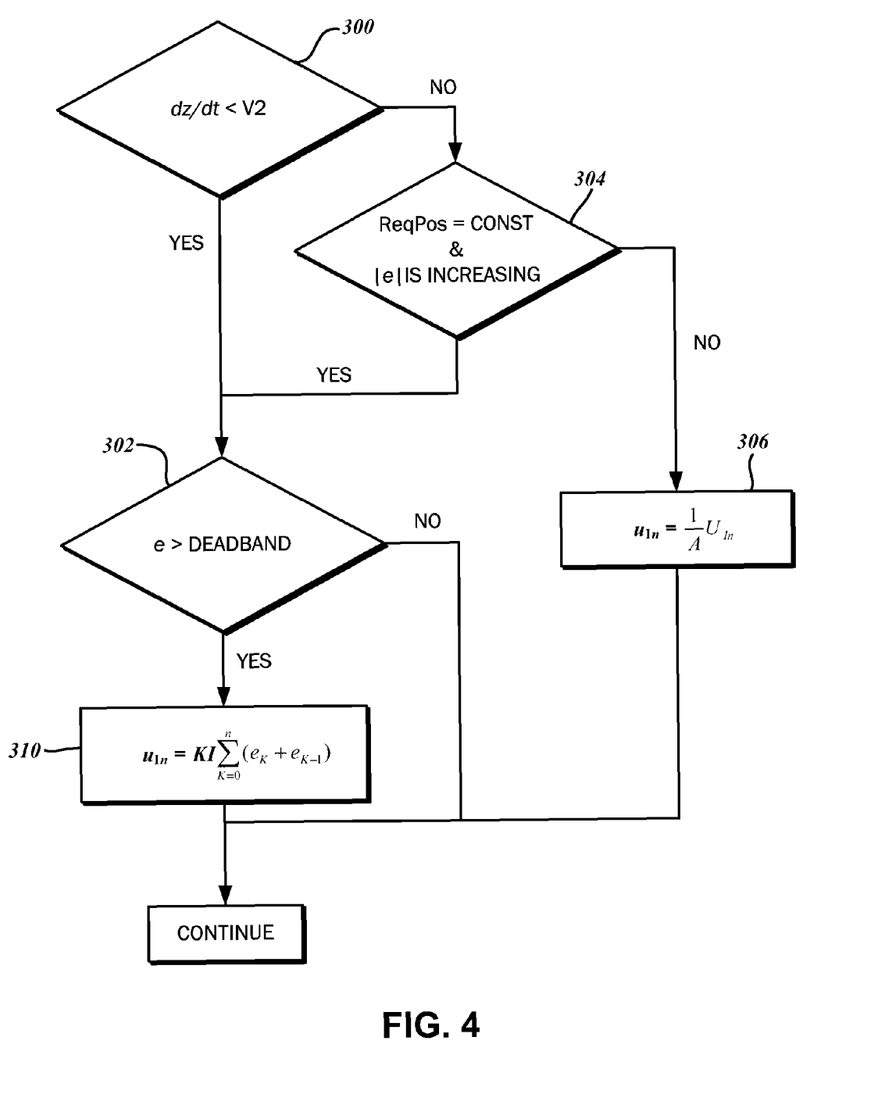
FIG. 4 is a flowchart illustrating the steps and conditions under which an integral gain factor is included in a response from the PID controller.

If the actuator is determined not to be moving, i.e., dz/dt<V2, then a decision branch 302 is evaluated next. Here, it is determined whether the error e is greater than a predefined deadband. It is understood that deadband refers to a value of the process variable surrounding the set point where no action is to occur for having reached a steady state at the specified set point. If evaluated true, as will be described in greater detail below, the integral term is added to the manipulated variable, and if evaluated false, there is no integral term added.

Decision branch 302 is also evaluated in accordance with the foregoing if the actuator was determined to be moving per decision branch 300, i.e., dz/dt was greater than the predefined threshold rate of change, and a decision branch 304 is evaluated true. This includes a determination that the manipulated variable or ReqPos has remained constant, and the error magnitude is increasing. If either of these sub-conditions is not met, the execution does not continue to decision branch 302. Instead, according to processing step 306, the integral term is assigned some fraction 1/A of the integral term assigned in a previous iteration. The circumstance in which this occurs is also referred to as an alternative set of conditions different from a first set of conditions. It is contemplated that this is effective to reduce the integral term contribution to the manipulated variable over a time period by successive approximation and is therefore self-extinguishing.

More particularly, the first set of conditions refers to the circumstances under which the integral term is added to the manipulated variable according to a processing step 310. These circumstances include where the decision branch 300 is evaluated false, the decision branch 304 is evaluated true, and the decision branch 302 is evaluated true. Additionally, the first set of conditions includes where the decision branch 300 is evaluated true and the decision branch 302 is evaluated true. As indicated above, the integral term is understood to be a product of an integral gain coefficient KI and a sum of n number of error magnitudes over a given time interval:

$$\sum_{K=0}^{n} (e_K + e_{K-1}).$$

In more general terms, the integral term is added to the manipulated variable only when the actuator does not move, or is moving slowly. Thus, the integral term is effective only at the end of the movement of the valve actuator 20 approaching the set point when the proportional term described above is insufficient to affect the manipulated variable, and residual error remains. This is understood to avoid integral windup/overshoot, which are understood to be particularly acute during slow ramp-ups with large valve actuators 20 since there is no integral accumulation while the proportional term is active. The integral gain coefficient can be kept high since the integral term is evaluated only when necessary. Furthermore, the successive reduction of the integral term contribution described above avoids low speed oscillation.

Referring again to the flowchart of FIG. 3, the method continues with a step 206 of adding a derivative term to the manipulated variable under a second set of conditions. Again, similar to the step 204 of adding the integral term to the manipulated variable, step 206 may involve storing the value to a temporary storage before generating a signal to the transducer 40. Along these lines, in accordance with one embodiment of the present disclosure, the derivative term is calculated by the derivative module 54.

Figure 5:
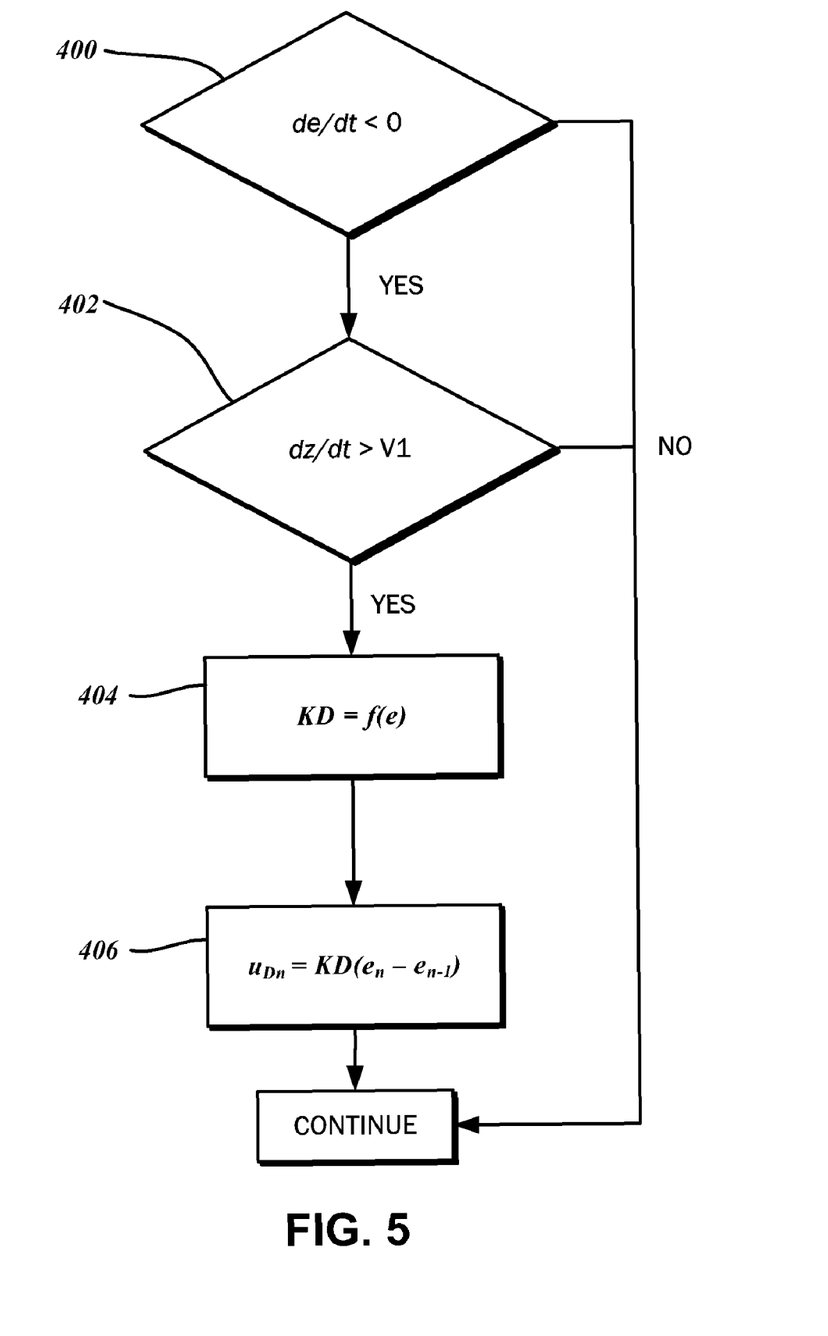
FIG. 5 is a flowchart illustrating the steps and conditions under which a derivative gain factor is evaluated.

As will be described in further detail below with reference to the flowchart of FIG. 5, the second set of conditions is different from the first set of conditions. In a decision branch 400, if the rate of change in the error magnitude, de/dt is a negative value, i.e., less than zero, the evaluation of the second set of conditions continues with a decision branch 402. Here, it is determined whether the valve actuator 20 is moving or not. The rate of change of the valve actuator 20 is given by dz/dt, and if it is greater than a threshold value V1, it is determined to be moving. Thus, together with a determination that the rate of change of the error magnitudes over the time interval is negative, the determination that the valve actuator 20 is moving defines the aforementioned second set of conditions.

If either of the foregoing evaluations set forth in decision branches 400, 402 are not met, the derivative term is not evaluated, and there is no contribution of the derivative term to the manipulated variable. If, however, the second set of conditions as defined above is met, a derivative gain coefficient KD is assigned as a function of the error f(e) according to step 404. In this regard, the derivative gain coefficient is greater, and hence the derivative module 54 is more aggressive when the actuator is closer to the target set point. Step 404 is followed by a step 406, where the derivative term is the assigned the product of the previously assigned derivative gain coefficient and the rate of change of the error magnitudes over the time interval: $KD(e_n - e_{n-1})$.

More generally, the derivative term is added to the manipulated variable only when the actuator position is approaching, as opposed to moving away from, the set point, and when the valve actuator 20 is moving. Limiting the derivative term contribution to when the rate of change of the error is negative as set forth above is contemplated to reduce the chance of multiple overshoots, and limits the effects of error noise, e.g., deviations in the feedback signal 34, upon the manipulated variable. Furthermore, limiting the derivative term contribution to only when the valve actuator 20 is moving limits the effects of signal noise, e.g., deviations in the valve position signal 30, upon the manipulated signal.

Thereafter, the method continues with a step 208 of generating a controller output of the manipulated variable, thereby adjusting the process variable. In further detail, the adder module 56 sums the output values from the proportional module 50, the output from the integral module 52 to the extent there was one generated under the first set of conditions discussed above, and the output from the derivative module 54, also to the extent there was one generated under the second set of conditions likewise discussed above. The manipulated variable is assigned this sum, and converted to the pneumatic output by the transducer 40 as discussed.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method for controlling a process variable based upon a set point, the method comprising:
    measuring the process variable;
    assigning a proportional term to a manipulated variable, the proportional term being a product of a proportional gain coefficient and an error magnitude of a difference between the set point and the process variable at a given time instance;
    adding an integral term to the manipulated variable under a first set of conditions, the integral term being a product of an integral gain coefficient and a sum of a predefined number of error magnitudes over a time interval;
    adding a derivative term to the manipulated variable under a second set of conditions different from the first set of conditions, the derivative term being a product of a derivative gain coefficient and the rate of change of the error magnitudes over the time interval; and
    generating a controller output of the manipulated variable, the process variable being responsively adjusted to the generated controller output.

2. The method of claim 1, wherein the first set of conditions includes a rate of change of the process variable over the time interval being less than a first threshold rate.

3. The method of claim 2, wherein the first set of conditions includes the error magnitude at the given time instance is greater than a predefined deadband.

4. The method of claim 1, wherein the first set of conditions includes a rate of change of the process variable over the time interval being greater than a first threshold rate, the manipulated variable over the time interval being constant, error magnitudes increasing over the time interval, and the error magnitude at the given time instance is greater than a predefined deadband.

5. The method of claim 1, further comprising:
    adding an integral term to the manipulated variable under an alternative set of conditions different from the first set of conditions, the added integral term being a previous integral term reduced by a predetermined factor.

6. The method of claim 5, wherein the alternative set of conditions includes a rate of change of the process variable over the time interval being greater than a first threshold rate, and the manipulated variable over the time interval being irregular.

7. The method of claim 5, wherein the alternative set of conditions includes a rate of change of the process variable over the time interval being greater than a first threshold rate, and the error magnitudes decreasing over the time interval.

8. The method of claim 1, wherein the second set of conditions includes a rate of change of the process variable over the time interval being greater than a second threshold rate, and the rate of change of the error magnitudes over the time interval being negative.

9. The method of claim 8, wherein the derivative gain coefficient varies according to the error magnitude.

10. The method of claim 1, wherein:
    the process variable is a position of a valve actuator;
    the set point relates to a position of a control valve driven by the valve actuator; and
    the manipulated variable is related to a pneumatic output to the valve actuator.

11. A controller device for an actuator of a control valve, the actuator including an input port and an output port, the device comprising:
    a set point input receptive to a signal representative of a set point value;
    an actuator position feedback connectible to the output port of the actuator and receptive to a process variable value;
    an actuator drive output connectible to the input port of the actuator, an output corresponding to the manipulated variable value being generated therefrom;
    a proportional module, a proportional term being generated thereby;
    an integral module, an integral term having a non-zero value under a first set of conditions being generated thereby;
    a derivative module, a derivative term having a non-zero value under a second set of conditions different from the first set of conditions being generated thereby; and
    an adder module, the manipulated value being generated thereby from a sum of the proportional term, the integral term, and the derivative term.

12. The controller device of claim 11, wherein the proportional term is a product of a proportional gain coefficient and an error magnitude of a difference between the set point value and the process variable value at a given time instance.

13. The controller device of claim 11, wherein the integral term is a product of an integral gain coefficient and a sum of a predefined number of error magnitudes of the differences between the set point value and the process variable values over a time interval.

14. The controller device of claim 11, wherein the derivative term is a product of a derivative gain coefficient and a rate of change of the error magnitudes of the differences between the set point value and the process variable values over a time interval.

15. The controller device of claim 11, wherein the first set of conditions includes a rate of change of the process variable over the time interval being less than a first threshold rate.

16. The controller device of claim 15, wherein the first set of conditions includes the error magnitude at the given time instance is greater than a predefined deadband.

17. The controller device of claim 11, wherein the first set of conditions includes a rate of change of the process variable over the time interval being greater than a first threshold rate, the manipulated variable over the time interval being constant, error magnitudes increasing over the time interval, and the error magnitude at the given time instance is greater than a predefined deadband.

18. The controller device of claim 11, wherein the integral term is a previous integral term reduced by a predetermined factor under an alternative set of conditions different from the first set of conditions.

19. The controller device of claim 18, wherein the alternative set of conditions includes a rate of change of the process variable over the time interval being greater than a first threshold rate, and the manipulated variable over the time interval being irregular.

20. The controller device of claim 18, wherein the alternative set of conditions includes a rate of change of the process variable over the time interval being greater than a first threshold rate and the error magnitudes decreasing over the time interval.

21. The method of claim 11, wherein the second set of condition includes a rate of change of the process variable over the time interval being greater than a second threshold rate, and the rate of change of the error magnitudes over the time interval being negative.

22. The device of claim 11, wherein the actuator is pneumatically driven, the manipulated variable being the flow of compressed air to the actuator.

23. An article of manufacture comprising a program storage medium readable by a data processing device, the medium including a tangible embodiment of one or more programs of instructions executable by the data processing device to perform a method for controlling a process variable based upon a defined set point, the method comprising:

measuring the process variable;

assigning a proportional term to a manipulated variable, the proportional term being a product of a proportional gain coefficient and an error magnitude of a difference between the set point and the process variable at a given time instance;

adding an integral term to the manipulated variable under a first set of conditions, the integral term being a product of an integral gain coefficient and a sum of a predefined number of error magnitudes over a time interval;

adding a derivative term to the manipulated variable under a second set of conditions, the derivative term being a product of a derivative gain coefficient and the rate of change of the error magnitudes over the time interval; and generating a controller output of the manipulated variable, the process variable being responsively adjusted to the generated controller output.

* * * * *